July 16, 1935.  F. E. GARDNER  2,007,967
GRINDING MACHINE
Filed Feb. 8, 1934
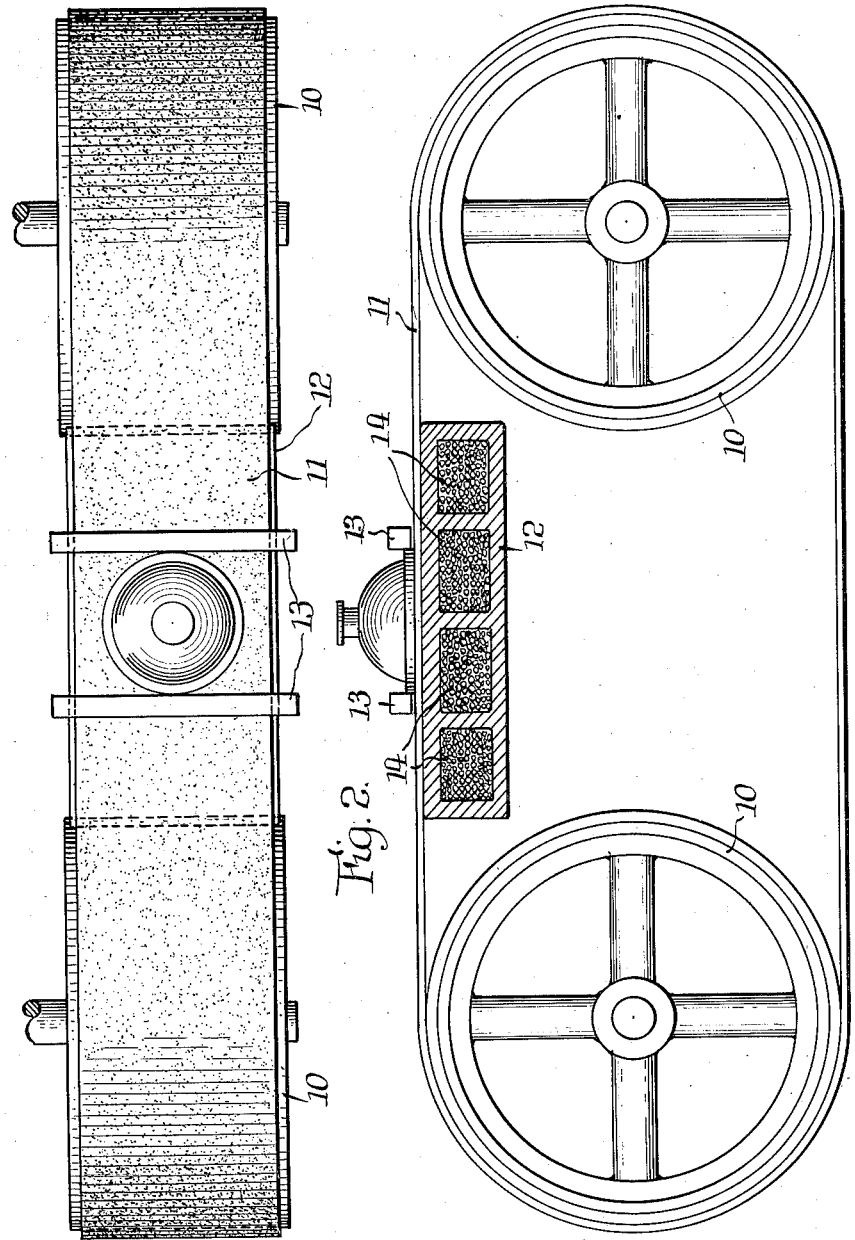
Inventor:
Frederic E. Gardner,
By Chindahl, Parker & Carlson
Attys.

UNITED STATES PATENT OFFICE 2,007,967

GRINDING MACHINE

Frederic E. Gardner, Beloit, Wis.

Application February 8, 1934, Serial No. 710,217

5 Claims. (Cl. 51—135)

The invention relates generally to grinding machines and more particularly to a machine employing a flexible abrasive belt.

The general object of the invention is to provide a grinding machine of this type having magnetic means for drawing work pieces of magnetic material against the belt to produce an effective grinding action.

Another object is to provide a machine of this type having a table, over which the belt passes and which supports the work pieces during the grinding thereof, said table including magnetic means for drawing the work pieces against the belt.

Other objects and advantages will become apparent from the following description taken in connection with the accompanying drawing, in which:

Figure 1 is a fragmentary plan view of a machine embodying the features of the invention.

Fig. 2 is a fragmentary elevational view of the portion of the machine shown in Fig. 1.

The present embodiment of the invention comprises generally a belt passing over pulleys positioned to provide a horizontal run of the belt, the outer surface of the belt being abrasive. Mounted immediately under said run is a fixed table for supporting work pieces as they are moved transversely across the belt, and embedded in the table are magnetic coils producing a field for drawing the work pieces against the abrasive surface of the belt.

As illustrated herein, the grinding machine comprises a pair of driving pulleys 10 which are mounted on spaced horizontal axes preferably parallel to each other. Extending around the pulleys and driven thereby is a flexible belt 11, the upper run of which is horizontal. The belt is of the usual type employed for abrasive work and has its outer surface provided with an abrasive.

The belt is adapted to abrade work pieces as they are placed on or moved across the upper run of the belt. To support the work pieces while being abraded, a fixed table or backing member 12 is positioned immediately under the upper run of the belt midway between the pulleys, so that the belt moves along the upper surface of the table and the work pieces are supported. Preferably the work pieces are moved transversely across the belt and to guide them during such movement and prevent them from being carried along with the belt, guides are provided such as a pair of bars 13 which extend across the belt and are spaced apart sufficiently to permit a work piece to move therebetween.

To cause the work pieces to bear against the abrasive surface of the belt and thus produce an effective abrasive action, magnetic means is provided which is positioned under the belt so that the field produced by said means will draw the work pieces against the belt. The preferred form of magnetic means comprises a plurality of magnetic coils 14 embedded in the table 12. Such coils produce a magnetic field which draws the work pieces against the belt and thus produces an effective grinding action.

From the above description, it will be apparent that I have provided a grinding machine of the type employing an abrasive belt, which is provided with magnetic means for drawing work pieces of magnetic material against the belt to produce an effective grinding action. It will also be apparent that the magnetic means is embedded in the table which supports the work pieces while being ground.

I claim as my invention:

1. A grinding machine comprising, in combination, an abrasive belt having a horizontal run, means for driving said belt, a table over which said run of the belt extends adapted to support a work piece while being ground, and magnetic means embedded in said table for drawing the work piece against the belt.

2. A grinding machine comprising, in combination, a pair of pulleys mounted on spaced axes, a belt having an abrasive outer surface, a table positioned adjacent one run of the belt between the pulleys, and magnetic coils embedded in said table for drawing work pieces of magnetic material against said abrasive surface.

3. A grinding machine comprising, in combination, a pair of pulleys mounted on spaced horizontal axes, a belt the outer surface of which is abrasive, said belt being driven by said pulleys, a fixed table mounted immediately under the upper run of the belt midway between the pulleys, and magnetic coils embedded in said table and creating a magnetic field for drawing work pieces of magnetic material against the abrasive surface of the belt as it passes over the upper surface of the table.

4. A grinding machine comprising, in combination, a belt having a horizontal run with the upper surface thereof abrasive, means for driving said belt, a fixed table mounted immediately under said belt, work guides mounted over and extending transversely across said run and over said table to guide work pieces as they are moved across said belt, and magnetic coils in said table producing a field adapted to cause the work pieces to bear against the abrasive surface of the belt as they are moved thereon.

5. A grinding machine comprising, in combination, a flexible belt having an abrasive face, means for driving said belt, and a fixed magnetic backing member positioned immediately adjacent a portion of said belt at the side opposite the abrasive face for drawing work pieces of magnetic material against said abrasive face and providing a support for the work pieces and the belt.

FREDERIC E. GARDNER.